Patented Feb. 7, 1939

2,146,323

UNITED STATES PATENT OFFICE 2,146,323

PENTA ALKYLENE GLYCOL DIALKYL ETHERS AND PROCESS OF MAKING THEM

Glenn F. Zellhoefer, Bloomington, and Carl S. Marvel, Urbana, Ill.; said Marvel assignor to said Zellhoefer, No Drawing. Application November 17, 1937, Serial No. 175,084

14 Claims. (Cl. 260—615)

The present invention relates to certain new organic compounds useful for various industrial purposes, for example, as solvents, plasticizers and the like. It also relates to a method of manufacturing such compounds.

Broadly stated, the object of the present invention is to provide a new group or series of organic compounds suitable for use as solvents.

More particularly, the object is to prepare certain new and useful organic compounds which contain, within their structure, what may be termed a plurality of "active solvent groups."

A further object is to provide a series of new organic compounds which may be designated "polyethers"; that is to say, compounds which contain a plurality of ether linkages within the molecule.

Another object is to prepare certain new ethers of the polyalkylene glycols, and to provide a suitable method for the manufacture thereof.

Other objects will be apparent as the invention is hereinafter more fully described.

The foregoing and other objects may be accomplished in accordance with the present invention, one aspect of which comprises the dialkyl ethers of penta-alkylene glycols, which may be represented by the general formula:

$$R^1-O-R^2-O-R^3-O-R^4-O-R^5-O-R^6-O-R^7$$

where: $R^1$ and $R^7$ are alkyl groups, either the same or different; and $R^2$, $R^3$, $R^4$, $R^5$, and $R^6$ are alkylene groups, either the same or different.

As illustrative of the type of compound contemplated by the present invention, mention may be made of the penta-alkylene glycol dialkyl ethers wherein the alkyl groups are derivable from the lower members of the aliphatic series, for example, the dimethyl-, the diethyl-, or the monomethyl-mono-ethyl-ethers of the penta-alkylene glycols.

For the purpose of illustrating the present invention still more fully, the penta-ethylene glycol diethers will be selected as of particular interest, in view of the fact that the raw materials required for their manufacture are available in commercial quantities at the present time. It is to be clearly understood, however, that the invention is not restricted to these particular embodiments, which are merely illustrative of the type of polyethers contemplated by the present invention, and are not to be considered restrictive of the scope thereof.

The polyethers of the present invention may be prepared by converting a trialkylene glycol monoalkyl ether to the alkali metal derivative, for example, by treatment with an alkali metal such as sodium. A diethylene glycol monoalkyl ether is converted to the corresponding halide, and this is then added to the above mentioned alkali metal derivative. The reaction results in the splitting out of an alkali metal halide and the formation of the dialkyl ether of penta-alkylene glycol.

The reactions involved in the preferred method of synthesis may be represented by the following equations:

1. $R^1-O-R^2-O-R^3-O-R^4-OH + M =$
    $R^1-O-R^2-O-R^3-O-R^4-OM + \frac{1}{2}H_2$
2. $R^1-O-R^2-O-R^3-O-R^4-OM +$
    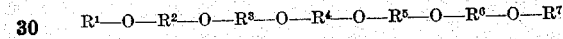
    $R^1-O-R^2-O-R^3-O-R^4-$
    $O-R^5-O-R^6-O-R^7 + MX$ As an alternative to the foregoing method, the tri-alkylene glycol monoalkyl ether may be converted to the corresponding halide, instead of to the alkali metal derivative; and the dialkylene glycol monoalkyl ether is converted to the alkali metal derivative, instead of the halide. When the halide and the alkali metal derivative are brought together, the alkali metal halide is split out, and the penta-alkylene glycol dialkyl ether is produced.

In order more clearly to disclose the nature of the present invention, a preferred embodiment thereof will now be described in considerable detail. It is to be understood, however, that this is done merely by way of example, and solely for the purpose of illustrating, by means of a specific example, the basic principles which are broadly applicable to all the compounds contemplated by the present invention. In other words, the invention is not restricted to the specific example hereinafter described.

Example

The dimethyl ether of penta-ethylene glycol constitutes a preferred embodiment of the present invention. This compound may be prepared in the following manner:

In a one-liter, three-necked round-bottomed flask equipped with a dropping funnel, reflux condenser and stirrer, is placed 3.1 moles of redistilled triethylene glycol monomethyl ether and 200 cc. of dry xylene. 2 moles of sodium is then gradually added to the mixture and after the sodium has completely reacted, 1 mole of methyl-ether of diethylene glycol chloride is slowly added to the mixture through the dropping funnel. After the reaction subsides, the flask is warmed for several hours in an oil bath, in order to complete the reaction. After the mixture has stood overnight, the precipitated sodium chloride is filtered, the precipitate washed with ether, and the filtrate distilled in vacuum.

In the foregoing description of a preferred embodiment of the present invention, it will be readily apparent to anyone skilled in the art that many variations may be made without departing from the spirit and scope thereof. Thus, the homologues of pentaethylene glycol dimethyl ether (for example, the corresponding diethyl ether, or the monomethyl-monoethyl ether) may be prepared in a manner similar to that described above, by selecting the proper trialkylene glycol monoalkyl ether, monoalkyl ether of dialkylene glycol halide, and the like. If preferred, the method may be reversed; i. e., the products may be prepared by treating the alkali metal derivative of dialkylene glycol monoalkyl ether with the monoalkyl ether of trialkylene glycol halide. Furthermore, reagents other than the alkali metals may be employed if desired, to prepare the alkali metal derivatives. The various conditions as to temperature, time, rate of addition of reactants and the like may be varied within certain limits, and the operators will have no difficulty in determining the optimum conditions for the preparation of any particular member of the class contemplated by the present invention. Many other variations in detail will be readily apparent to anyone skilled in the art. The invention is therefore to be restricted only in accordance with the following patent claims.

We claim:

1. A penta alkylene glycol dimethyl ether.
2. A penta alkylene glycol diethyl ether.
3. A penta ethylene glycol dinormal lower alkyl ether.
4. Penta ethylene glycol dimethyl ether.
5. Penta ethylene glycol diethyl ether.
6. Penta ethylene glycol monomethyl monoethyl ether.
7. A compound having the structural formula:
R¹—O—R²—O—R³—O—R⁴—O—R⁵—O—R⁶—O—R⁷
where: R¹ and R⁷ are normal alkyl groups; and R², R³, R⁴, R⁵, and R⁶ are alkylene groups.
8. A compound having the structural formula:
R¹—O—R—O—R—O—R—O—R—O—R—O—R²
where R¹ and R² are normal lower alkyl groups; and R is the ethylene group.
9. The process of preparing a penta alkylene glycol dialkyl ether which comprises converting not more than one of the group consisting of a trialkylene glycol monoalkyl ether and a dialkylene glycol monoalkyl ether, to the corresponding halide, converting the other member of said group to the corresponding alkali metal derivative and reacting said halide with said alkali metal derivative, whereby to split out an alkali metal halide and produce a dialkyl ether of penta alkylene glycol.
10. The process of preparing the dinormal lower alkyl ethers of penta ethylene glycol which comprises converting not more than one of the group consisting of triethylene glycol normal lower alkyl monoethers and diethylene glycol normal lower alkyl monoethers to the corresponding halide, converting the other member of said group to the corresponding alkali metal derivative and reacting said halide with said alkali metal derivative, whereby to split out an alkali metal halide and produce a normal lower alkyl diether of penta ethylene glycol.
11. The process of claim 10, wherein said trialkylene glycol monoalkyl ether is triethylene glycol monomethyl ether.
12. The process of claim 10 wherein said dialkylene glycol monoalkyl ether is diethylene glycol monomethyl ether.
13. The process of claim 10 wherein said halide is the chloride.
14. The process of claim 10 wherein said alkali metal derivative is the sodium derivative.

GLENN F. ZELLHOEFER.
CARL S. MARVEL.